US009388076B2

(12) United States Patent
Chastain et al.

(10) Patent No.: US 9,388,076 B2
(45) Date of Patent: Jul. 12, 2016

(54) 3-MODE BLENDED FIBERS IN AN ENGINEERED CEMENTITIOUS COMPOSITE

(75) Inventors: Jeffrey Charles Chastain, Fontana, CA (US); Yongjun Chen, Fontana, CA (US); Mark Thomas Fisher, Fontana, CA (US); Caidian Luo, Fontana, CA (US); Huaijun Wang, Fontana, CA (US)

(73) Assignee: James Hardie Technology Limited, Dublin (IE)

( * ) Notice: Subject to any disclaimer, the term of this patent is extended or adjusted under 35 U.S.C. 154(b) by 332 days.

(21) Appl. No.: 14/116,969

(22) PCT Filed: May 11, 2012

(86) PCT No.: PCT/US2012/037641
§ 371 (c)(1),
(2), (4) Date: Mar. 11, 2014

(87) PCT Pub. No.: WO2012/155103
PCT Pub. Date: Nov. 15, 2012

(65) Prior Publication Data
US 2014/0191436 A1    Jul. 10, 2014

(51) Int. Cl.
| *C04B 16/02* | (2006.01) |
| *C04B 16/06* | (2006.01) |
| *C04B 20/00* | (2006.01) |
| *C04B 28/02* | (2006.01) |
| *B28B 1/52* | (2006.01) |

(52) U.S. Cl.
CPC .............. *C04B 20/0052* (2013.01); *B28B 1/522* (2013.01); *C04B 28/02* (2013.01); *Y02W 30/97* (2015.05)

(58) Field of Classification Search
CPC .................................. C04B 16/02; C04B 16/06
See application file for complete search history.

(56) References Cited

U.S. PATENT DOCUMENTS

| 7,727,326 | B1 * | 6/2010 | Trangsrud ........... C04B 20/0052 |
| | | | 106/644 |
| 7,815,841 | B2 * | 10/2010 | Merkley .................. C04B 18/24 |
| | | | 106/731 |
| 2003/0211802 | A1 | 11/2003 | Keck et al. |
| 2005/0284339 | A1 | 12/2005 | Brunton et al. |
| 2008/0257218 | A1 | 10/2008 | Hojaji et al. |
| 2010/0234491 | A1 | 9/2010 | Khorrami et al. |

FOREIGN PATENT DOCUMENTS

WO    WO 2012/155103       11/2012

OTHER PUBLICATIONS

International Search Report and Written Opinion for corresponding PCT Application No. PCT/US2012/037641, filed May 11, 2012, dated Oct. 16, 2012, 16 pages.
Supplementary European Search Report for corresponding PCT Application No. PCT/US2012/037641, dated Feb. 2, 2015, 7 pages.

* cited by examiner

*Primary Examiner* — Paul Marcantoni
(74) *Attorney, Agent, or Firm* — Knobbe, Martens, Olson & Bear, LLP

(57) ABSTRACT

Disclosed herein are fiber reinforced cement composite materials incorporating a 3-mode fiber blend that includes cellulose pulp and synthetic fibers in a ratio selected to provide the composite material with improved water absorption characteristics and the same or improved mechanical properties as compared to equivalent composite materials reinforced with predominantly or all cellulose fibers. Also disclosed herein are fiber blends comprised of a combination of cellulose fibers and polypropylene fibers adapted to reinforce cementitious composite articles manufactured by the Hatschek process and autoclave cured.

10 Claims, 7 Drawing Sheets

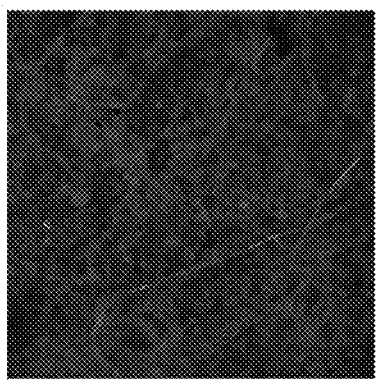
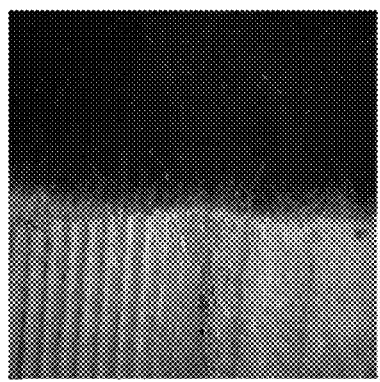
Fig. 3B
Fig. 3C

3-MODE BLENDED FIBERS IN AN ENGINEERED CEMENTITIOUS COMPOSITE

CROSS-REFERENCE TO RELATED APPLICATIONS

This application claims the benefit of priority under 35 U.S.C. §119(e) of U.S. Provisional Application No. 61/485,280 filed on May 12, 2011, which is incorporated herein by reference in its entirety.

BACKGROUND OF THE INVENTION

1. Field of the Invention

Embodiments of the present disclosure relate to cementitious composite materials incorporating reinforcement fibers with improved properties developed primarily for use in the building and construction industry.

2. Description of the Related Art

Fiber reinforced cementitious composite materials have been widely used in building construction. Cellulose fibers, in particular, have been used to reinforce various fiber cement building products because they impart favorable properties to the building product. Moreover, cellulose fibers have a unique microstructure with unique physical and mechanical properties that are suitable for the Hatschek process, the preferred commercial process for manufacturing fiber cement sheets and panels. For example, the micro-fibrils in cellulose fibers help to build an effective filtration system to catch the fine particles in the fiber cement slurry to form a thin fiber-particle film during the Hatschek process. The micro-fibrils also branch out with the branches functioning as anchors in the cured fiber cement composite thereby enhancing the bonding at the interface between the fibers and cementitious matrix.

However, there are also disadvantages associated with using cellulose fibers to reinforce cementitious building products. For example, the chemical composition and large surface area of the micro-fibril structure of the cellulose fibers render the fibers highly hydrophilic. The hydrophilic nature of cellulose fibers can increase water absorption of the fiber cement composite, which can result in some performance issues. Furthermore, cellulose fibers are generally more water sensitive and less alkali resistant. Therefore they can experience progressive degradation over time.

While synthetic fibers have been used to reinforce cementitious composite materials, prior art products reinforced with synthetic fibers not only require a much longer manufacturing cycle but also have less than desirable mechanical properties as compared to products reinforced with cellulose fibers. For example, fiber cement composites reinforced with synthetic fibers have been typically limited to the air cure process because synthetic fibers tend to disintegrate at high temperature conditions of the autoclave process that is commonly used for curing cellulose fiber reinforced cement composites. The air cure process takes much longer, normally 28 days, as compared to the autoclave cure process, which usually takes less than 3 days. Replacement of cellulose fibers with synthetic fibers can also result in lower flexural strength of the fiber cement composite due to the lower fiber-matrix interface bonding. Moreover, non-cellulose fibers can create added difficulties in manufacturing using the Hatschek process. Accordingly, there is a need for improved reinforcement fibers that can impart desirable mechanical properties to cementitious composites and are also compatible with the Hatschek process and autoclave curing.

SUMMARY OF THE INVENTION

The compositions, materials, articles, and methods of manufacture of this disclosure each have several aspects, no single one of which is solely responsible for its desirable attributes.

Any terms not directly defined herein shall be understood to have all of the meanings commonly associated with them as understood within the art. Certain terms are discussed below, or elsewhere in the specification, to provide additional guidance to the practitioner in describing the compositions, methods, systems, and the like of various embodiments, and how to make or use them. It will be appreciated that the same thing may be said in more than one way. Consequently, alternative language and synonyms may be used for any one or more of the terms discussed herein. No significance is to be placed upon whether or not a term is elaborated or discussed herein. Some synonyms or substitutable methods, materials and the like are provided. Recital of one or a few synonyms or equivalents does not exclude use of other synonyms or equivalents, unless it is explicitly stated. Use of examples in the specification, including examples of terms, is for illustrative purposes only and does not limit the scope and meaning of the embodiments herein.

One embodiment of the present disclosure provides a fiber cement composite material incorporating a novel fiber blend (3-mode blend) adapted to reinforce and improve the mechanical properties of the composite material. The fiber cement composite material includes about 10%-80% by weight cementitious binder, about 20%-80% by weight silica, about 0%-50% by weight density modifier, about 0%-10% additives, and about 0.5%-20% by weight a 3-mode fiber blend that includes refined cellulose fiber, unrefined cellulose fiber and synthetic fibers. The refined cellulose fiber is normally shorter with a length of 0.8 to 2.0 mm and high surface areas. The unrefined cellulose fiber has a length of 1.5 to 3.0 mm with medium surface areas. The synthic fiber has longer fibers and lowest surface areas. The refined cellulose fiber accounts for 50 to 75% of the total fiber mass or population. The unrefined cellulose fiber accounts for 10 to 25% of the total fiber mass or population while the synthetic fiber is about 10 to 25% of total fiber mass or population. In one implementation, the ratio of cellulose fibers to synthetic fibers in the fiber blend is between 3 and 24, more preferably between 4 to 12. In another implementation, the synthetic fibers comprise polypropylene (PP) fibers. In another implementation, the synthetic fibers consist essentially of PP fibers. The PP fibers are preferably fibrillated with irregular forms. In some implementations, the PP fibers have an average length of between 4 to 15 millimeters (mm), preferably 6 to 12 mm In some other implementations, the fiber cement composite material comprises about 3% to 10% by weight cellulose fibers and about 0.25% to 2% by weight PP fibers, or preferably 0.5% to 1.5% by weight PP fibers.

In other implementations, the fiber blend includes three modes of fiber length distribution. One mode can comprise refined shorter cellulose fibers. A second mode can comprise unrefined cellulose fibers. A third mode can comprise long PP fibers. Preferably, the average length of the refined shorter cellulose fibers is less than the average length of the unrefined cellulose fibers; and the average length of the PP fibers is longer than the average length of the unrefined cellulose fibers. In one implementation, one mode can comprise about 50% to 80% refined shorter cellulose fibers having an average length of less than or equal to 2 mm. A second mode can comprise about 10% to 25% unrefined cellulose fibers having an average length of greater than or equal to 2 mm, preferably between 2 mm to 2.5 mm. A third mode can comprise about 10% to 25% long PP fibers having an average length of between 4 mm to 15 mm. In yet some other implementations, the PP fibers are engineered with a hydrophilic surface and a hydrophobic bulk part to form fiber cement grade PP fibers. In one embodiment, the fiber reinforced composite materials preferably has a moisture movement (MM) of less than 0.5%. In another embodiment, the material have a moisture movement of at least 25% less than that of an equivalent fiber cement material.

Another embodiment of the present disclosure provides a fiber reinforced cement composition comprising a hydraulic binder, aggregates, cellulose fibers, and polypropylene fibers. Preferably, the polypropylene fibers have irregular forms. In one implementation, the ratio of the weight percent of cellulose fibers to polypropylene fibers is between 3 to 24, preferably between 4 to 12. In another implementation, the composition comprises about 2% to 10% by weight cellulose fibers and about 0.25% to 2% by weight polypropylene fibers. In another implementation, the fiber reinforced cement composition is adapted for forming exterior wall sidings.

Yet another embodiment of the present disclosure provides a method of manufacturing a fiber reinforced cementitious article suitable for the hatschek process and autoclave curing. The method includes the steps of forming a fiber cement slurry which can comprise a hydraulic binder, aggregates, water, cellulose fibers and polypropylene fibers; depositing the fiber cement slurry on a plurality of sieve cylinders that are rotated through the fiber cement slurry wherein the cellulose fibers and polypropylene fibers filter the fiber cement slurry to form a thin fiber cement film. The method further includes the steps of transferring a series of sequential layers of the thin fiber cement films to a felt so as to build a thicker fiber cement layer; removing water from the thicker fiber cement layer; transferring and winding the fiber cement layer onto a size roller to achieve desired final thickness; cutting and unwinding fiber cement sheet onto a conveyor; and curing the fiber cement sheet in an autoclave at a temperature of at least 150° c. In some implementations, the method further includes the step of forming the autoclave cured fiber cement sheet into a building construction panel.

BRIEF DESCRIPTION OF THE DRAWINGS

FIGS. 3A-3C are various views of the synthetic fiber shown in FIGS. 2A-2B in the fiber composite matrix.

DETAILED DESCRIPTION OF THE PREFERRED EMBODIMENT

Figure 1A:
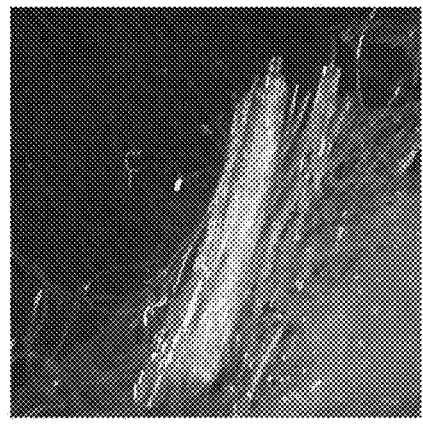
FIGS. 1A-1B are photos of two different types of synthetic fibers after the Parr bomb test according to certain embodiments of the present disclosure.

Disclosed herein are fiber cement articles reinforced with a fiber blend pre-selected to provide the fiber cement articles with improved mechanical and/or chemical physical properties. Also disclosed herein are fiber blends comprised of synthetic and natural fibers at pre-selected ratios for reinforcing cementitious composite materials and methods for manufacturing. Also disclosed herein are synthetic and cellulose fiber blends adapted to reinforce cementitious composite articles manufactured by the Hatschek process and autoclave cured. Also disclosed herein are fiber reinforced cement formulations that include cellulose pulp and synthetic fibers in a ratio selected to provide a building material with improved water absorption characteristics and the same or improved mechanical properties as compared to equivalent building materials reinforced with predominantly or all cellulose fibers.

One of the challenges in incorporating synthetic reinforcing fibers, such as polypropylene (PP) fibers, in fiber cement composite materials is that synthetic fibers, unlike cellulose fibers, are not configured to catch sufficient amount of fine particles in fiber cement slurry to form a thin fiber cement film during the Hatschek process. Additionally, most synthetic fibers like PP fibers will disintegrate at elevated autoclave temperatures. As such, while synthetic fibers have been incorporated in fiber cement articles, the synthetic fibers are not successfully added in sufficient quantities as a substitute for substantial amounts of cellulose fibers, especially not in fiber cement panels and sheets that are typically manufactured by the Hatschek process and autoclave cured. The inventors have developed certain fiber reinforced composite material compositions that incorporate fiber blends comprising synthetic and cellulose fibers selected to reinforce cementitious articles manufactured by the Hatschek process and cured at elevated autoclave temperatures without deleterious effects.

Fiber Blends

Various embodiments of the present disclosure provide novel 3-mode blends of synthetic and cellulose fibers that can be incorporated in a cementitious composition for reinforcing composite materials formed by the Hatschek process and cured at elevated autoclave temperatures. In certain preferred embodiments, the synthetic fibers include polypropylene (PP) fibers that are engineered with certain properties. In one embodiment, the PP fibers have a high degree of crystallinity, high linear density, and high thermal resistance. In some implementations, the PP fibers have a linear density of at least 2.2±0.22 dtex and a high thermal resistance. In one embodiment, the PP fibers are engineered to have a high melting point and narrow molecular weight distribution to survive the high temperatures. In some implementations, the PP fibers have length of between 4 to 15 millimeters (mm), preferably between 6 to 10 mm of mono-filaments in some embodiments. The PP fibers can be mono-filament or fibrillated with different shapes, including circular or irregular forms. The cross-section of the PP fibers can have eccentric sheath core or concentric sheath core, hollow splittable, zigzag, wavy, or spiral types. The irregular shapes can help for improving the mechanical interlocking bonding to resist fracture of the fiber cement. The irregularity of the PP fiber surface of various preferred embodiments will help the PP fibers to be caught on the filter drum for film formation during the Hatschek process.

To improve the affinity between PP fibers and cement, the PP fibers of some embodiments of the present disclosure may be modified to have a hydrophilic surface while leaving the bulk part of PP fiber hydrophobic to produce a fiber cement grade PP fiber. In some embodiments, the PP fiber surface is made hydrophilic by first chemically altering the fiber surface layer and followed by depositing an extraneous layer on top of the altered fiber surface layer, thereby generating a sharp interface. Given the non-reactive character of the PP fiber surface, the PP fibers require generating high energy species, such as radicals, ions, molecules in excited electronic states, etc. Coating physical treatment involves itself in the generation, usually by high-energy methods, of matter fundamentals, such as atoms or atomic clusters, to be deposited on material surfaces. Such treatments for modification include flame, corona, cold plasma, hot plasma, UV, laser, electron beam, ion beam, and sputtering. Impregnation of PP fiber with surfactants is an example of the additional layer on the PP fibers surface.

In some embodiments, the PP fiber surface is made hydrophilic by wet treatment such as covalent attachment of polymer chains. Wet treatment may include exposing the PP fiber surface to oxidizing wet chemicals such as chromic acid, nitric acid or potassium permanganate to result in general oxidation, forming carbonyl groups, hydroxyl groups and carboxylic acid groups on the polymer surface. The covalent attachment of polymer chains to the PP fiber surface can be achieved by either graft polymerization or polymer grafting after the pretreatment with UV, electron beam, and γ-ray irradiation.

The PP fibers of preferred embodiments can be supplied in a bundle form. Appropriate dosing and mixing procedures and equipment can be used to ensure proper dispersion of the fibers, although the surface of the fibers may have been modified to be hydrophilic.

The PP fibers are preferably blended with cellulose fibers at preselected ratios for optimum performance. In one embodiment, the percent by weight ratio of PP fibers to cellulose fibers in a fiber cement composition is between 3 to 24, or between 4 to 12. The cellulose fibers preferably have a length between 0.5 to 3 mm. The micro-fibril structures in the cellulose fibers are suitable for filtration process, which in turn are good for film formation on the filter drum in a Hatschek process. PP fibers in monofilament form have poor capability of catching fine particles from film formation. Well blended PP fibers and cellulose fibers according to preferred embodiments of the present disclosure will build an interpenetration fiber network, which in turn provides good film formation in the Hatschek process.

Figure 1B:
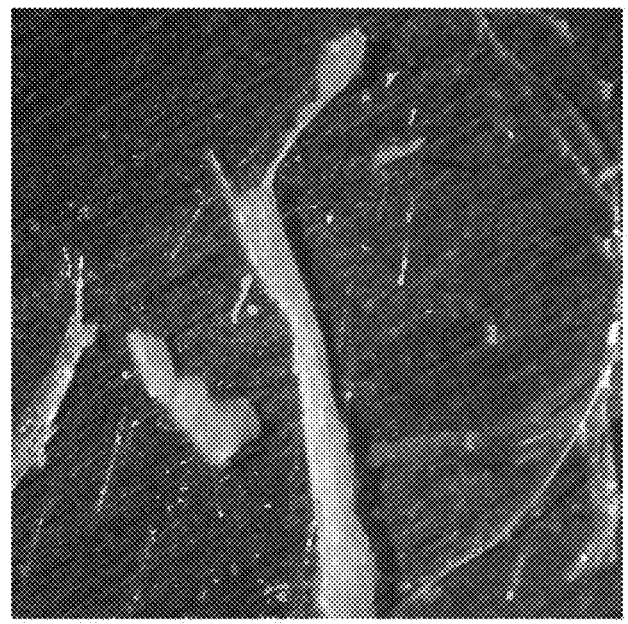

FIG. 1A is a photo showing high crystalline PP fibers according one embodiment of the present disclosure. FIG. 1B is a photo showing a general commercial PP fiber. The PP fibers in both FIGS. 1A and 1B are shown after the Parr bomb test, which simulates elevated autoclave curing condition for the fiber cement materials. The bomb cell (part No at 4744 with total capacity at 45 ml) is from Parr Instrument Company. Weight at 0.5 grams of synthetic fiber is put in the PTFE cup with pre-filled 25 ml of water with pH at 13. The synthetic fiber is submerged inside the water, which may float onto the water top surface. The PTFE cover is put back and sealed inside the bomb body. The bomb with sample is put in the oven at 160 C and left inside for 15 hrs before cooling down to room temperature. The bomb body is opened for fiber damage study under microscopy after cooling down to room temperature. The high crystalline PP fibers still retained good fiber integrity while the commercial PP fibers broke into pieces and slightly melted together. Thus, the high crystalline PP fibers can survive the autoclave for the short hydration process time with increased temperatures.

In some embodiments, the fiber blend comprises three modes of fibers. The fiber blend includes a combination of refined shorter cellulose fibers, preferably between 0.8 mm to 2 mm with highest surface areas; unrefined cellulose fibers, preferably between 2 mm to 2.5 mm with medium surface areas; and long PP fibers, preferably between 4 mm to 15 mm with lowest surface areas. The combination of the three modes of fibers helps to achieve balanced product performance in Modulus of Rupture (MOR), toughness and nailablity. In some implementations, the fiber blend comprises about 50 to 80% refined shorter cellulose fibers, about 10 to 25% unrefined cellulose fibers, and about 10 to 25% long PP fibers.

Fiber Cement Compositions

One preferred composition of the fiber reinforced composite material comprises a cementitious binder, aggregates, optional density modifier, optional various additives, and a fiber blend comprising cellulose fibers and PP fibers adapted to improve various material properties. It will be appreciated that not all of these components are necessary to formulate a suitable building product, and thus, in certain embodiments, the formulation may simply comprise cementitious binder and blended fibers.

The cementitious binder is preferably Portland cement but can also be, but is not limited to, high alumina cement, lime, high phosphate cement, and ground granulated blast furnace slag cement, or mixtures thereof. The aggregate is preferably ground silica sand but can also be, but is not limited to, amorphous silica, micro-silica, diatomaceous earth, coal combustion fly and bottom ash, rice hull ash, blast furnace slag, steel slag, mineral oxides, mineral hydroxides, clays, magnasite or dolomite, metal oxides and hydroxides, and polymeric beads, or mixtures thereof.

The density modifiers can be organic and/or inorganic lightweight materials with a density less than 1.5 g/cm$^3$. The density modifiers may include plastic materials, glass and ceramic materials, calcium silicate hydrates, microspheres, and volcanic ashes, including perlite, pumice, shirasu basalt, and zeolites in expanded forms. The density modifiers can be natural or synthetic materials.

The additives can include, but are not limited to, viscosity modifiers, fire retardants, waterproofing agents, silica fume, geothermal silica, thickeners, pigments, colorants, plasticizers, dispersants, forming agents, flocculents, drainage aids, wet and dry strength aids, silicone materials, aluminum powder, clay, kaolin, alumina trihydrate, mica, metakaolin, calcium carbonate, wollastonite, and polymeric resin emulsion, and mixtures of thereof or other materials.

The cellulose fibers in the fiber blend can be unrefined/unfibrillated or refined/fibrillated cellulose pulps from various sources, including but not limited to bleached, unbleached, semi-bleached cellulose pulp. The cellulose pulp can be made of softwood, hardwood, agricultural raw materials, recycled waste paper or any other forms of lignocellulosic materials. Cellulose fibers can be made by various pulping methods. In the pulping process wood or other lingocellulosic raw materials such as kenaf, straw, and bamboo are reduced to a fibrous mass by the means of rupturing the bonds within the structure of lignocellulosic materials. This task can be accomplished chemically, mechanically, thermally, biologically, or by combinations of these treatments.

The synthetic fibers in the fiber blend can be of any type including, but not limited to, glass fibers, polyester, polypropylene, aromatic polyamide, and acrylic fibers. These types of fibers can be made to be used in a composite product that is air cured or treated in such a way as to be able to survive a higher temperature autoclave cycle. An example of such a fiber can be found as described in U.S. Pat. No. 6,010,786 (Takai).

In one embodiment, the fiber cement composition comprises about 10%-80% by weight cementitious binder; about 20%-80% by weight silica (aggregates); about 0%-50% by weight density modifier; about 0%-10% by weight additives; and about 0.5%-20% by weight of fiber blend comprising cellulose fibers and PP fibers. In one implementation, the fiber cement formulation comprises about 4.5%-9% fiber blend. In another implementation, the fiber blend comprises 3%-10% cellulose fibers, or preferably 4%-8% cellulose fibers based on total mass of dry mix.

In another embodiment, which is particularly suitable for autoclave curing, the formulation comprises about 20%-50% cement; about 30%-70% ground silica; about 0%-50% density modifiers; about 0%-10% additives; and about 2%-10% fiber blend comprising cellulose fibers and PP fibers.

Substitution of Cellulose Fibers with Pre-selected PP Fibers

Certain preferred embodiments of the present disclosure are directed to substituting a fraction of the cellulose fibers in a fiber cement composition with PP fibers, preferably fiber cement grade PP fibers, to reduce the moisture absorption of the resulting product without detrimentally affecting other properties. In one embodiment, up to 50% of cellulose fibers in a fiber cement composition can be substituted with fiber cement grade PP fibers. In some implementations, the fiber cement composition includes 0.5% or more hydrophobic polypropylene (PP) fibers as well. The fiber blend will provide the balanced benefits of cellulose and PP fibers in which cellulose fibers serve as processing aids, density modifier and reinforcement, while PP fibers are used as the secondary reinforcement to enhance the toughness. The water sensitivity of the formed composite will be significantly reduced.

Figure 2A:
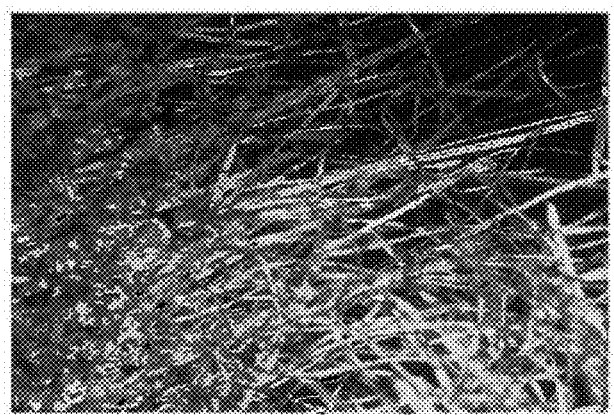
FIGS. 2A-2B are photos illustrating examples of synthetic fibers in a cement matrix according to certain preferred embodiments before the autoclave cycle under a microscope.
Figure 2B:
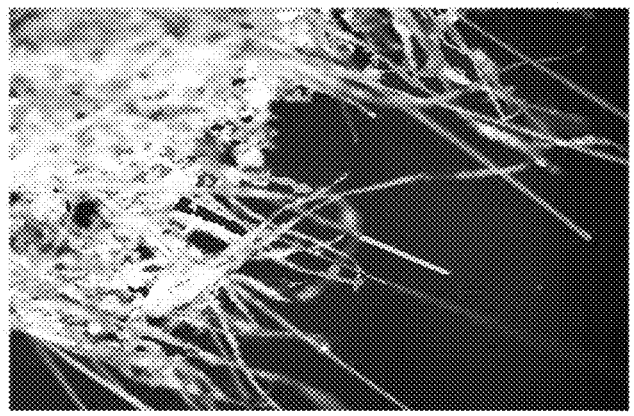

In some embodiments, by replacing up to about 50% of the cellulose fibers with variable lengths distributed between 0.8-3.0 mm with the addition of a small amount of hydrophobic PP fibers, the hydrophilic property of the fiber cement slurry and composites can be significantly reduced while the film formation capability in the Hatschek process is still maintained. The long term performance or reinforcement of the blended (PP and cellulose fibers) fiber cement composite is retained by the stability of the PP fibers. The length of the PP fibers can be engineered to suit different reinforcement requirements. For example, shorter and high surface area fibers may improve strength of the composite, while longer fibers can make the composite more ductile FIGS. 2A and 2B are photos taken under polarized light of a fiber blend incorporated in a cementitious formulation according to certain preferred embodiments of the present disclosure. The fiber blend comprises fiber cement grade PP fibers and cellulose fiber. As shown in FIGS. 2A and 2B, the mixture of PP and cellulose fiber was dispersed very well within the inter-network structure.

Figure 3A:
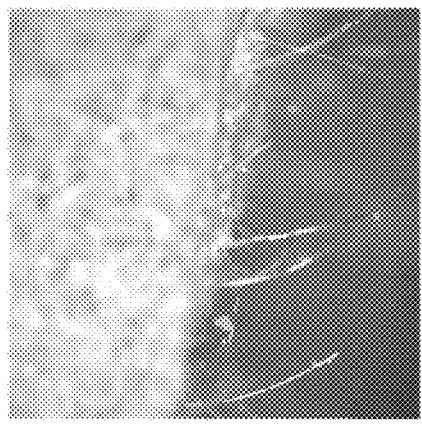
Figure 4:
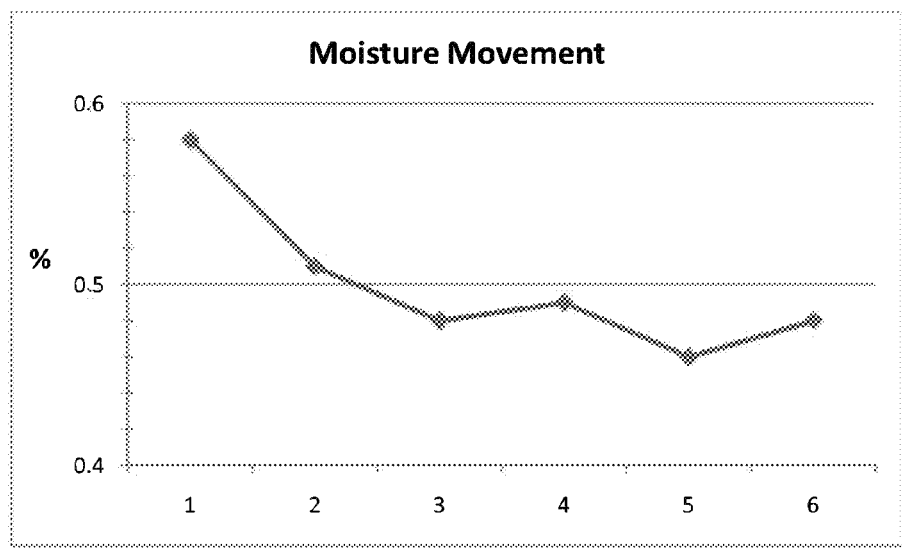
FIG. 4 is a chart showing the moisture movement of various fiber cement composite material samples made in accordance with certain preferred embodiments as compared to controls.

FIGS. 3A-3C are photos showing a fiber cement composition reinforced with a fiber blend according to one embodiment after elevated autoclave curing. The fiber blend comprises a mixture of PP fibers and cellulose fibers. As shown in FIG. 3A, the PP fibers remain fully intact after autoclave curing. FIG. 3C shows that upon sample breaking, the PP fibers did not break and pulled out on the sample matrix surface, which is different from that of cellulose fibers as shown in the photo in FIG. 3B. This observation is consistent with the fact that PP fiber is more ductile than that of cellulose. Moisture movement (MM) in the preferred embodiments has shown a surprising reduction compared to control samples in post carbonation measure. After carbonation, samples were tested and the moisture movement was reduced to a level that showed vast improvements over the control samples FIG. 4 shows the moisture movement for the present disclosure in samples (3-6) and the controls (1-2). Samples (3-6) were made in accordance with the fiber cement formulations disclosed herein. As shown, samples made according to the preferred embodiments had less moisture movement than the control samples, with the improvement of up to about 21%. The reduction in moisture movement can inhibit propagation of joint spacing and cracking around nails when the products are in service.

Figure 5:
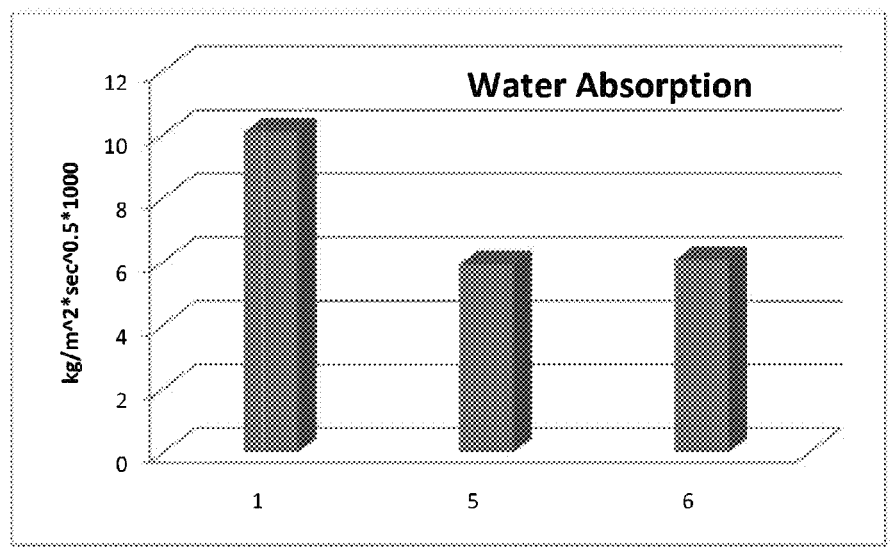
FIG. 5 is a chart showing the water absorption values of fiber cement composite material samples made in accordance with certain preferred embodiments compared to the control formulation.

Water absorption coefficient (WAC) is also shown to be significantly reduced in the preferred embodiments. FIG. 5 shows the water absorption coefficient for the samples (5-6) and the control (1). As shown, there is about 41% improvement for the invention samples over the control. The lower water absorption values lead to a more durable fiber cement product. It has been found that a decrease in water absorption properties transfers into better performance in freeze thaw and shrinkage of the building material. The WAC test method is based on ISO 15148:2002(E). Cellulose pulp was tested at from 4 to 6% and the polypropylene fiber was tested at from 0.25 to 1.5% in various combinations. On the lower end of the fiber combinations, 0.25-0.50% PP fiber with 4.5% cellulose fiber did not provide enough reinforcement in the form of strain property. On the upper end of using 1.5% PP fiber and 6% cellulose fiber, it was found that the water absorption improvements did not further improve while the cost increased significantly. It was found that at least 5% cellulose fiber is needed to achieve the required strain to form a durable product. The initial screenings of a filter pad formulations showed similar results to the properties and characteristics of the scaled up Hatschek process formulations that led to the final blend of fibers that provided a composite product that was comparable to an all cellulose fiber composite product.

With an overall total reduction in fiber content, and more specifically cellulose fibers, it has been found that water absorption and moisture movement properties have improved leading to increased overall durability of the fiber cement composite. The 3-mode blended fiber composite maintains many of its physical properties as well and provides increased drainage on the process side which makes the Hatschek machine run faster and with less load. While density is increased slightly due to reduction of fiber content, nailability and strength of the product are acceptable for installation. No predrilling is required of the blended composite product.

Moisture movement (MM) in the preferred embodiments has shown a surprising reduction compared to control samples in post carbonation measure. After carbonation, samples were tested and the moisture movement was reduced to a level that showed vast improvements over the control samples. In FIG. 4, it can be seen that the reduction in moisture movement in Examples 1, 2, 3, and 4 of the blended composites compared to the control samples.

Other preferable formulations can be seen in the Examples in Table 1 below.

TABLE 1

Summary of Properties

| Example | MOR Mpa | Density g/cc | WAC (back) kg/m$^2$*sec 0.5*1000 | MM % | Nailability |
|---|---|---|---|---|---|
| 1 (Control) | Par | Par | 10.08 | 0.58 | Excellent |
| 2 (Control) | Par | Par | 17.63 | 0.51 | Excellent |
| 3 | Better | Higher | 14.44 | 0.48 | Excellent |
| 4 | Better | Higher | 12.05 | 0.49 | Very Good |
| 5 | Par | Higher | 5.91 | 0.46 | Very Good |
| 6 | Better | Higher | 6.04 | 0.48 | Very Good |

TABLE 2

Summary of Properties I

| Example | MOR Mpa | Density g/cc | WAC (back) kg/m²*sec 0.5*1000 | MM % | Nailability |
|---|---|---|---|---|---|
| 1 (Control) | Par | Par | 10.08 | 0.58 | Excellent |
| 5 | Par | Higher | 5.91 | 0.46 | Very Good |
| 6 | Better | Higher | 6.04 | 0.48 | Very Good |

TABLE 3

Summary of Properties II

| Example | MOR Mpa | Density g/cc | WAC (back) kg/m2*sec 0.5*1000 | MM % | Nailability |
|---|---|---|---|---|---|
| 2 (Control) | Par | Par | 17.63 | 0.51 | Excellent |
| 3 | Better | Higher | 14.44 | 0.48 | Excellent |
| 4 | Better | Higher | 12.05 | 0.49 | Very Good |

Density of the blended composites has shown an increase as can be seen in Tables 2 and 3 above. Table 2 shows formulation examples with a lower density modifier while Table 3 shows formulations that do not contain a density modifier. The nailing test results provided values that were comparable to the control samples. The mechanical properties show durability of the product and installation soundness that provide a composite that can replace current fiber cement products at a reduced raw material cost while not suffering a decline in performance. The MOR, density, and MM tests were done according to ASTM C1186.

Water absorption coefficient (WAC) is also shown to be significantly reduced in the preferred embodiments. FIG. 5 indicates water absorption rates of two composite examples, 5 and 6. It has been found that a decrease in water absorption properties influence better performance in freeze thaw and shrinkage of the building material. The WAC test method is based on ISO 15148:2002(E).

The preferred embodiment also improves the smoothness of the product by more than 15%.

Various preferred embodiments of the present disclosure provide fiber cement building materials with improved Modulus of Rupture (MOR), acceptable density range and lower moisture movement (MM) with comparable performance in other criteria. In one embodiment, the fiber cement building material has improved resistance to freeze and thaw and improved dimensional stability compared to the materials made with 100% cellulose fibers, for example using 7-10% pulp content, as well as other property enhancements, while maintaining the mechanical and physical properties such as nailability. This achievement was unexpected as the brittleness of a higher cement containing composite was thought to hinder nailing capabilities.

Some embodiments of the present disclosure are directed to manufacture a new building material that contains a blend of cellulose fibers and polypropylene fibers at preselected ratios. The formulation can be used to produce fiber-reinforced cement composites with the Hatschek manufacturing process. In the Hatschek process, a diluted aqueous suspension is filled in the tub fitted with means for uniformly distributing constituents within the tubs. A filter drum is partially immersed in each tub and the rotation makes the deposition on the drum surface to build up the thin film layer composed of fibers, aggregates, hydraulic binders and additives. The film is carried by a felt onto a size roller, where the film thickness is built up. It is then cut to unwind from the size roll and one sheet of fiber cement is formed. The fiber cement sheet can be subsequently cured at a temperature up to 175° C. autoclave, preferably 160° C. and a pressure of about 75 psi without degrading the fibers.

The embodiments illustrated and described above are provided as examples of certain preferred embodiments of the present invention. Various changes and modifications can be made from embodiments presented herein by those skilled in the art without departure from the spirit and scope of this invention.

What is claimed is:

1. A fiber cement composite material, comprising:
about 10%-80% by weight cementitious binder;
about 20%-80% by weight silica;
about 0%-50% by weight density modifier;
about 0%40% additives; and
about 0.5%-20% by weight of a 3 mode fiber blend that comprises refined shorter cellulose fibers, unrefined cellulose fibers, and long polypropylene fibers, wherein the average length of the refined shorter fibers is less than the average length of the unrefined cellulose fibers, and wherein the average length of the long polypropylene fibers is greater than the average length of the unrefined cellulose fibers.

2. The fiber cement composite material of claim 1, wherein the polypropylene fibers have an average length of between 6 mm-10 mm.

3. The fiber cement composite material of claim 1, wherein the polypropylene fibers are engineered with a hydrophilic surface and a hydrophobic bulk part.

4. The fiber cement composite material of claim 1, wherein the percent by weight ratio of the cellulose fibers to the polypropylene fibers is between 3 to 24.

5. The fiber cement composite material of claim 1, wherein the fiber blend comprises about 60% to 80% refined shorter cellulose fibers having an average length of less than or equal to 2 mm, about 10% to 25% unrefined cellulose fibers having an average length of between 2 to 3 mm, and about 10 to 25% long polypropylene fibers having an average length between 4 to 15 mm.

6. The fiber cement composite material of claim 1, wherein said material having a moisture movement (MM) of less than 0.5%.

7. The fiber cement composite material of claim 1, wherein the moisture movement of the composite material is at least 25% less than that of an equivalent fiber cement composite material containing no synthetic fibers.

8. A fiber reinforced cement composition, comprising:
a hydraulic binder;
aggregates;
cellulose fibers comprising refined shorter cellulose fibers and unrefined cellulose fibers; and
polypropylene fibers, said polypropylene fibers having irregular forms, wherein the ratio of the percent by weight of cellulose fibers to polypropylene fibers is between 3 to 24.

9. The fiber reinforced cement composition of claim 8, wherein the composition comprises about 4% to 6% by weight cellulose fibers and about 0.25% to 1.25% polypropylene fibers.

10. The fiber reinforced cement composition of claim 8, wherein the ratio of the weight ratio of the refined shorter cellulose fibers to the unrefined cellulose fibers is between 2.4 to 8.

* * * * *